United States Patent [19]

Everman et al.

[11] 4,143,773

[45] Mar. 13, 1979

[54] APPARATUS FOR ASSEMBLING ITEMS

[75] Inventors: Wayne F. Everman, Cedar Falls, Iowa; Vincent E. Bernard, Richardson, Tex.

[73] Assignee: Swift & Company, Chicago, Ill.

[21] Appl. No.: 765,082

[22] Filed: Feb. 3, 1977

Related U.S. Application Data

[62] Division of Ser. No. 653,918, Jan. 30, 1976, Pat. No. 4,051,753.

[51] Int. Cl.$^2$ .......... B65G 47/26

[52] U.S. Cl. .......... 414/787; 29/239; 83/89; 83/105; 83/732; 198/425; 198/458

[58] Field of Search .......... 214/1 R; 198/42 S, 458; 29/239; 83/89, 105, 420, 732

[56] References Cited

U.S. PATENT DOCUMENTS

| | | | |
|---|---|---|---|
| 2,247,696 | 7/1941 | Papendick | 83/105 |
| 2,362,126 | 11/1944 | Fry | 83/105 |
| 3,810,554 | 5/1974 | London et al. | 198/425 X |

FOREIGN PATENT DOCUMENTS

| | | | |
|---|---|---|---|
| 62779 | 6/1928 | Austria | 83/105 |
| 430888 | 6/1935 | United Kingdom | 83/105 |

*Primary Examiner*—Frank E. Werner

*Attorney, Agent, or Firm*—Charles E. Bouton

[57] ABSTRACT

Food patties are severed from logs and fed into magazines. A plurality of logs may be processed simultaneously; and the severed patties may be simultaneously fed in columns into one or more magazines. Under certain conditions columns of patties are moved through a transition means to separate same prior to entering the magazines. Thereafter successive magazines are moved to a position where the patties are sequentially deposited from the magazines onto a divider web and conveyor.

2 Claims, 8 Drawing Figures

APPARATUS FOR ASSEMBLING ITEMS

This is a division of application Ser. No. 653,918, filed Jan. 30, 1976, now U.S. Pat. No. 4,051,753, issued Oct. 4, 1977.

The present invention relates to an improved method and apparatus for assembling a plurality of items; and more specifically relates to an improved method and apparatus for slicing meat patties from plural adjacent logs, assembling quantities of the patties, arranging the patties uniformly on divider material, and stacking the patties with uniform sheets of divider material interleaved between layers or patties.

It is frequently required in manufacturing operations to assemble large numbers of produced items in uniform patterns for subsequent handling and particularly for packaging. Many industries produce products which are subjected to such operations. The food industry is an example where many products such as confections, bakery products, meat and dairy items must be uniformly assembled. In the food industry it is particularly important, for purposes of sanitation, that the manual handling of products by operators is minimized or eliminated. Heretofore food products, for example, have been delivered directly from the production operation onto trays or divider members which are then grouped into larger units for packaging and the like. The production of meat patties is a particular operation where the assembling of uniform groups of items for packaging has presented problems.

Heretofore in such operations the slowest step or piece of equipment has dictated the maximum speed at which the entire production line can be operated. Additionally, it is most often required that a large number of separate operators have been necessary to manage each component of the production line. Accordingly, in the production of meat patties, for example, separate operators have been required for patty forming, for arranging the patties on divider members, and for stacking the patties and dividers in packages. Moreover, the arranging of patties in uniform groups has been a relatively slow operation, subject to delay due to misplacement of patties or the absence of patties, and has often prevented the patty forming operation, which may be a slicing operation, from being conducted at maximum speed and efficiency.

Accordingly, it is a principal object of the present invention to provide an improved method and apparatus for assembling items of product which permits the forming or production operation to be conducted independently of the grouping and packaging operations.

It is another object of the present invention to provide an improved method and apparatus for assembling items wherein the items are temporarily received from production in storage magazines which organize the items in uniform patterns.

It is still another object of the present invention to provide an improved method and apparatus for assembling meat patties wherein the patties are concurrently sliced from plural logs and delivered directly as columns of product into magazines which are subsequently moved to a separate position whereat the patties are sequentially and uniformly discharged onto divider material for packaging.

It is yet another object of the present invention where patties are concurrently sliced from plural logs in lateral side to side contact and delivered to separate channels in one or more magazines to provide an improved method and apparatus for separating patties sliced from adjacent logs so that the patties are laterally spaced from side to side.

Basically, the present invention involves the steps of forming a plurality of items and immediately delivering the items into one or more movable magazines while the latter are held at a first position. Thereafter each magazine is moved to a second position, preferably upright, whereat the items are sequentially discharged into uniform groups and patterns. The apparatus for performing the method includes forming means to produce the items, movable magazines to receive the items at a first position directly from production and discharging means, located at a second position, for sequentially releasing or removing items from the magazines into uniform groups and patterns.

In certain forms of the present invention the items are severed from plural logs which are arranged in parallel side to side contact and in certain instances the items produced thereby are separated from lateral side to side contact before being delivered to the magazines. In the latter instance, the apparatus also includes transition means adjacent the first position to laterally space the items.

Further objects and advantages of the present invention will become apparent upon reading the following detailed description of a preferred embodiment of the invention in conjunction with the drawings wherein.

Figure 1:
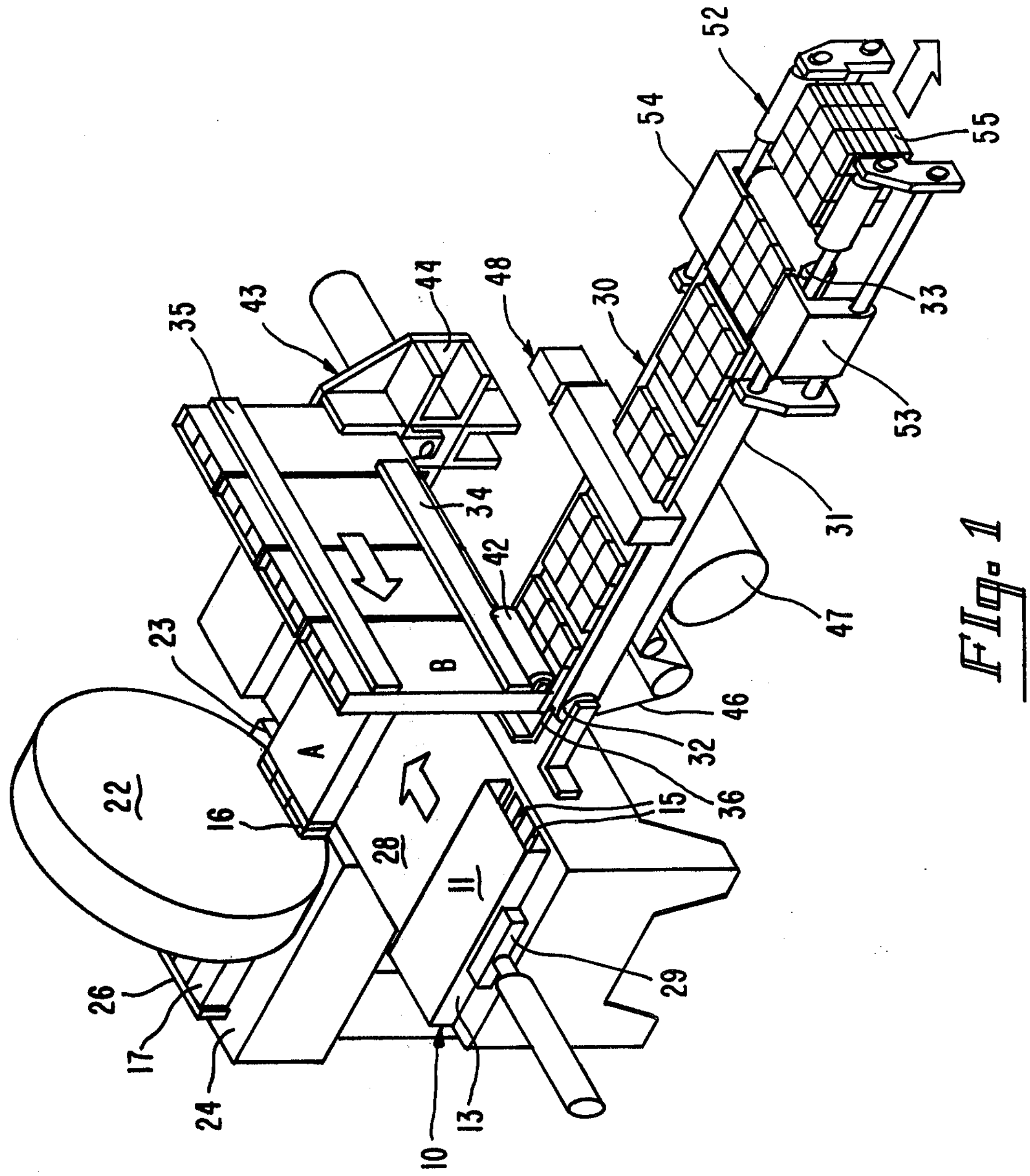
FIG. 1 is a perspective view of a preferred apparatus of the invention.
Figure 3:
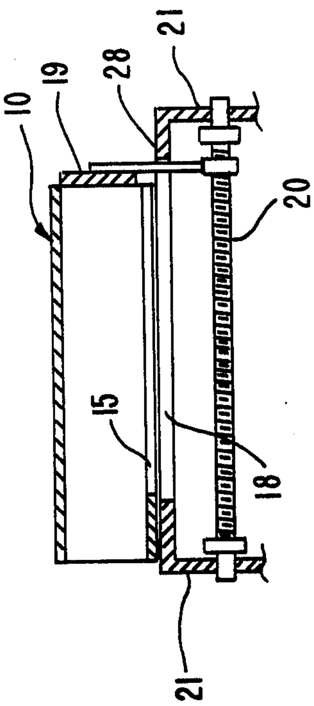
FIG. 3 is a partial elevation view in section taken at lines 3—3 in FIG. 2.
Figure 2:
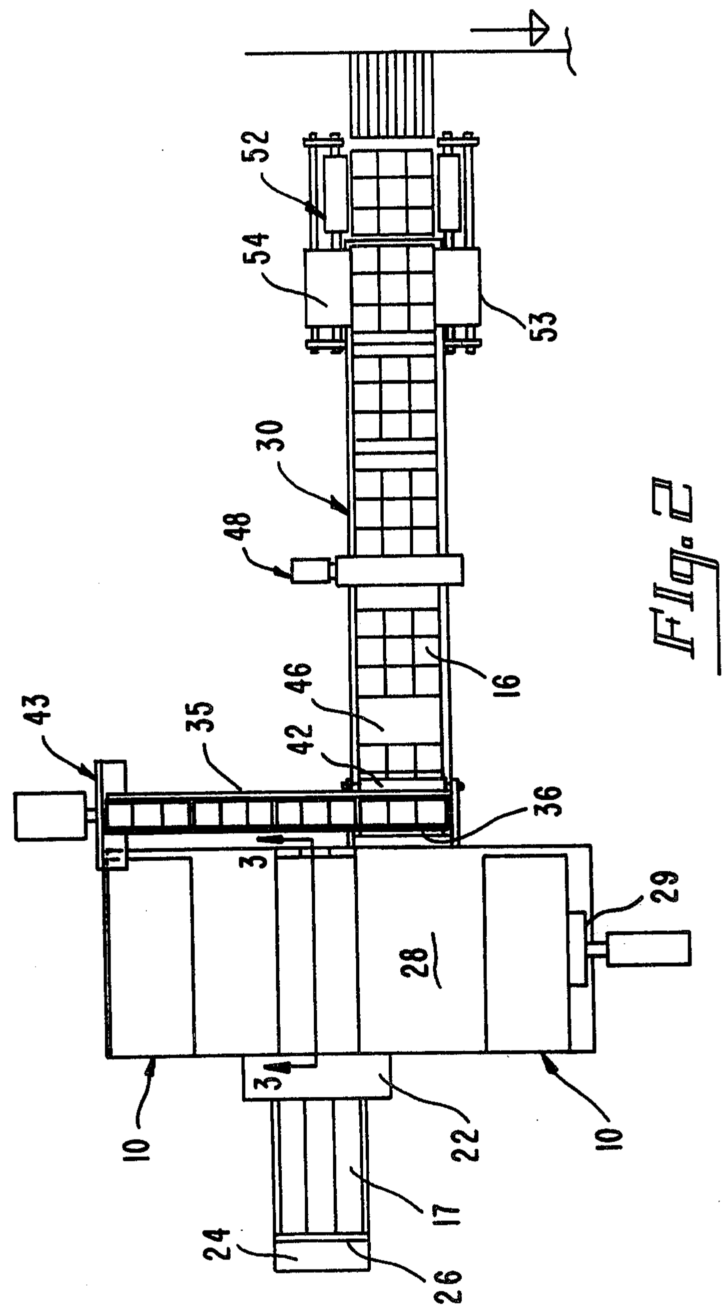
FIG. 2 is a plan view of the apparatus of FIG. 1.

A preferred embodiment of the present invention is directed to the formation, grouping and packaging of meat patties. Preferably a substantially continuous supply of patties is formed. According to the present invention the patties may be formed by any one of a variety of well-known techniques. For example, unfrozen ground meat may be molded in dies and ejected therefrom. It is important however that the patties be uniform in size, shape and weight. Accordingly, it is preferred to form the patties by a highly accurate slicing operation wherein ground meat is first compacted and formed into uniform relatively long logs and then frozen and tempered to a temperature of about 28° F. which is believed optimum for good slicing. The logs may be of substantially any cross section such as round or rectangular; however, it is preferred that the logs be square so as to produce uniformly square patties which, when packaged, occupy a minimum volume and space.

According to the preferred embodiment, a plurality of the tempered meat logs are arranged parallel and adjacent one another in lateral side to side contact for simultaneous slicing by a single rotating blade. The adjacent logs are advanced together at a uniform rate into the path of the blade whereby patties of uniform thickness will be severed therefrom. It is further preferred that the adjacent logs be of rectangular cross section so as to provide resistance against the action of the slicer blade toward a single anvil at one side of the logs. The advancement of the logs into the path of the slicing blade will serve to also advance the sliced patties in columns aligned with the respective logs and in the same direction beyond the blade. A magazine of dimensions sufficient to accommodate the cross sectional size and shape of the plurality of logs is positioned at the discharge side of the slicing blade so as to receive the columns of sliced patties. It is also preferable that each column of patties be advanced against a movable end member so as to hold the forwardmost patties upright until it is advanced fully into and through the magazine.

While it is preferred that a magazine contain a number of patty columns equal to the number of logs sliced simultaneously, it is possible that the magazine may be segregated into plural channels which may contain a multiple of the number of logs. In the latter instance, after sufficient of the logs are sliced to fill one or more of the channels the magazine is shifted laterally so as to align the next adjacent channels with the next logs to be sliced.

It is also possible, where desired, to place each column of patties in plural separate magazines or in separate segregated channels in a large magazine. In either instance the walls of the magazines or channels will separate the columns of slices that are formed from initially closely adjacent logs. Accordingly in such applications of the invention the columns of slices will be laterally separated slight distances before entering the magazines or channels. This is accomplished by first advancing adjacent columns along paths that diverge vertically and as the respective patties become vertically displaced the patty side edge interfaces (initially in side to side contact) slip against one another so that side portion of the patties of one column are partially exposed at the top and side portions of the patties of the other column are exposed at the bottom. Those side portions, as they are exposed, are then contacted by guides which urge the adjacent patties in opposite lateral directions so as to separate the columns a small distance. The path of the columns thus separated laterally are then vertically converged to a single plane before the columns enter the magazine (or magazines).

When a magazine is filled with sliced patties, the magazine is removed from its first position and may be either temporarily stored or transported directly to a second position. At this time, a further magazine (or group of magazines as the case may be) may be immediately positioned adjacent the path of the slicer blade and a succeeding plurality of meat logs advanced through the blade so as to load the further magazine. In this way, it may be seen that the patty forming operation (and the slicing equipment) may be conducted at maximum efficiency by a single or minimum number of operators until the total production requirements are completed or until the supply of meat logs is exhausted.

Each filled magazine is subsequently moved to a second position where it is preferably held in a vertical attitude so as to permit discharge of the stored patties by gravity. The second position is located directly above and transverse to a conveying path whereon a supply of divider members is advanced. According to the type of magazines utilized and the pattern in which the patties are to be deposited on the divider members, one or more magazines may be simultaneously held at the second position. Rows or layers of patties are released sequentially from the bottom end of the magazine (or magazines) so as to fall in lateral rows upon the divider members. Since the multiple channels of the magazine (or magazines) present a plurality of patties for simultaneous release, the patties will be deposited in uniform parallel rows on the divider members. Accordingly, the divider members are advanced at a uniform rate or in steps so that the successive rows of patties will complete a pattern or group comprised of a desired number. Periodically the discharge of patties is interrupted, or the advance of the divider members is accelerated, so as to leave a space between certain successive rows of patties deposited thereon. In this way, distinguishable groups or layers of patties are provided.

Preferably, a continuous web of divider material is fed along the conveying path at a uniform speed; and the discharge or release of patties is periodically interrupted so as to form spaces on the web between the desired groups of patties. Thereafter the continuous web is severed across the spaces upon arrival at a location downstream of the second position.

The divider members, or several segments of web, and the groups of patties thereon are subsequently stacked to form layers of patties with interleaving members.

Figure 5:
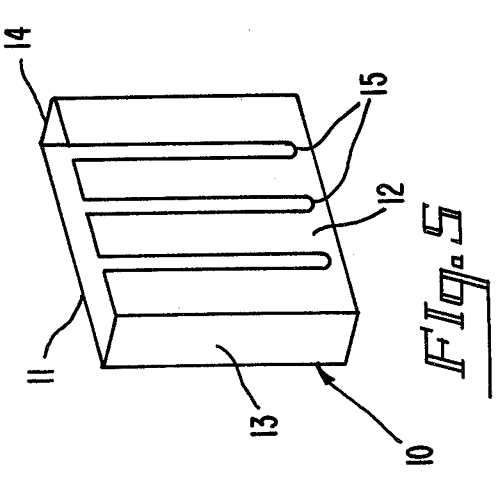
FIG. 5 is a perspective view of a preferred magazine shown in FIG. 1.
Figure 4:
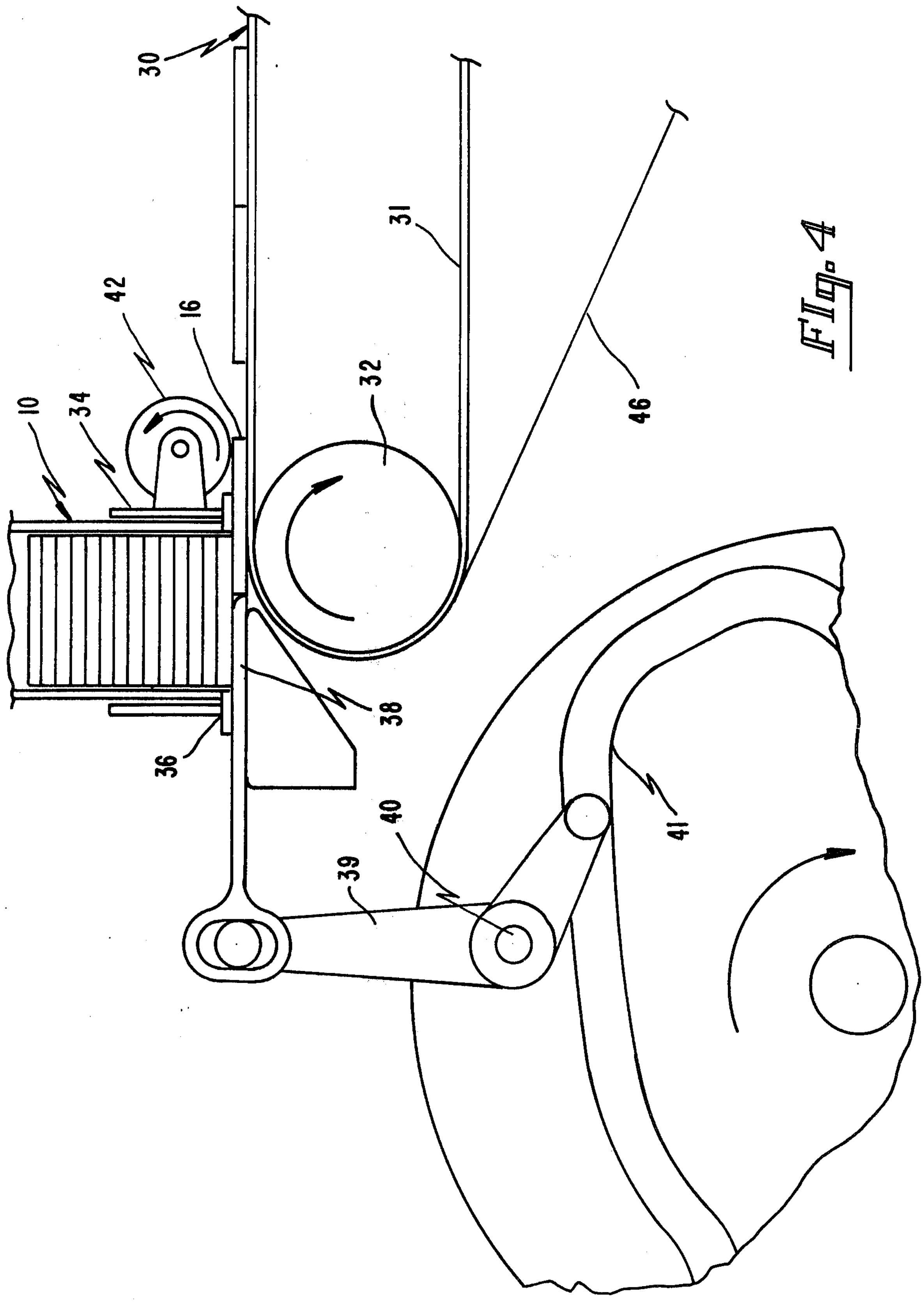
FIG. 4 is a partial elevation view of a portion of the apparatus of FIG. 1 comprising the means for discharging patties from a magazine.

As may be seen in the FIGS. 1 through 8, apparatus according to the present invention for assembling quantities of meat patties comprises one or more magazines generally 10 of substantially rectangular construction and having a top panel 11 bottom panel 12 and side panels 13 and 14. A preferred magazine 10, shown in FIG. 5, is open at both ends and is of an internal width closely approximating the width of three patties, the latter number being equal to the number of logs 17 that are shown to be processed simultaneously. The magazine 10 also includes longitudinal slots 15 in the bottom panel 12 extending along the center of the spaces for each column of patties 16.

The slicer is comprised of a rotary blade (not seen in the drawing) which cooperates with an anvil 23 at the end of a feed bed 24 across which the logs are advanced by a pusher 26. As shown in the drawings the slicer generally 22 is of sufficient size to accommodate a plurality of logs 17 at one time. Three logs are shown on the bed 24 of the slicer and being advanced simultaneously by the pusher 26.

A magazine generally 10 is shown in a horizontal attitude at a first position "A" to receive patties 16 at a point adjacent the anvil 23. A table 28 is provided to support the magazine 10 in that position, and a ram 29 is reciprocable across the table 28 to move successive magazines 10 to the first position.

It is preferred that as the patties 16 are urged forwardly by the logs 17, the forwardmost patties will be held upright until fully advanced into the magazine 10. To accomplish this the magazine 10 is positioned with the slots 15 downwardly against the table 28 where they will register with guideways 18 when positioned to receive product. The guideways 18 are aligned with the logs 17 and permit small back-stop members 19 to be reciprocable within the magazine 10. The back-stop members 19 are, in turn, reciprocably driven by any suitable mechanism, such as a powered screw shaft 20 which is journaled in bearings 21 attached to the under-side of the table 28. Preferably the screw shaft 20 is synchronized with the pusher 26 of the slicer.

A take-off conveyor generally 30 is shown in the drawings extending beyond the slicer generally 22 and in substantially the direction that product is discharged therefrom. However, it is to be understood that exact location and direction of the take-off generally 30 with respect to the slicer generally 22 is not restricted to the configuration illustrated.

The take-off conveyor generally 30 comprises a continuous belt 31 trained about at least a pair of pulleys; namely, an infeed pulley 32 and a discharge end pulley 33. At least one of the pulleys 32, 33 is drivingly connected to a source of power to move the upper run of belt 31 toward the discharge pulley 33. The power means in conventional and does not constitute a part of the present invention.

At a location slightly above and to one side of the take-off conveyor generally 30, and near the infeed end thereof, is a stationary tray support 34 which is sufficient to hold one or more loaded magazines, generally 10, in an upright or vertical position. The tray support 34 will, however, close the lower ends of the channels in each magazine 10 and hence prevent the patties 16 from falling therefrom. Preferably an upper guide 35 is fixed above support 34 to stabilize the upright magazines; adjacent the tray support 34 and directly over the upper run of the take-off conveyor generally 30 is a breech support 36 for a magazine generally 10. The breech support 36 is of open construction so as to hold one or more magazines generally 10 without obstructing the lower end thereof. Thus, patties 16 from the columns stored therein may drop through the breech support 36. Magazines 10 may be moved directly from the first position "A" to a second position "B" on the breech support 36. However, it is preferred to move each magazine horizontally after filling and then turn it upright onto the tray support 34 from which it is moved to position "B" by hand or by a suitable mechanism, not shown.

Immediately beneath the breech support 36 is a shuttle discharge gate 38 which is reciprocably mounted to move across the end of the magazine generally 10. As may be best seen in FIG. 4 the shuttle discharge gate 38 is reciprocated by a trip lever 39 mounted on a pivot pin 40 and actuated by a cam 41 that is driven in conjunction with the conveyor drive mechanism, not shown. Hence, the shuttle discharge gate 38 is caused to reciprocate across the end of a magazine generally 10 at rate dependent on the speed of the take-off conveyor generally 30. A pinchroll 42 is rotatably supported above conveyor belt 31 just beyond the breech support 36 and cooperates to positively discharge patties 16.

The magazines 10 are turned upright by a rotatable turret generally 43, having multiple gripping pockets 44 spaced every 90° thereon. Each filled magazine 10 is moved horizontally on the table 28 until one corner thereof is received in a pocket 44. Turret 43 is then rotated 90° to move the magazine upward and onto the tray support 35, at which point another pocket is in position to receive the next magazine 10.

Preferably, a substantially continuous web of divider material 46 extends from a supply roll 47 thereof and is trained about the infeed pulley 32 and the upper run of the continuous belt 31.

A short distance downstream of the take-off conveyor generally 30 from the breech support 36 is located a cutting mechanism generally 48 which is periodically operable to sever the continuous web 46. This mechanism and its operation is also substantially well-known in the art and may be similar to that shown in U.S. Pat. No. 3,537,497.

Still further downstream of the take-off conveyor generally 30 is a stacking means generally 52 comprising a pair of web gripping elements 53, 54 and a lowerator 55. The gripping elements 53, 54 are located to either side of the take-off conveyor generally 30 and are reciprocable in the direction of the conveyor so as to grip, advance, and release severed segments of the web material 46 onto the lowerator 55. The latter is spring loaded or counterbalanced so as to descend by increments with each layer of divider material and product thereon.

Figure 6:
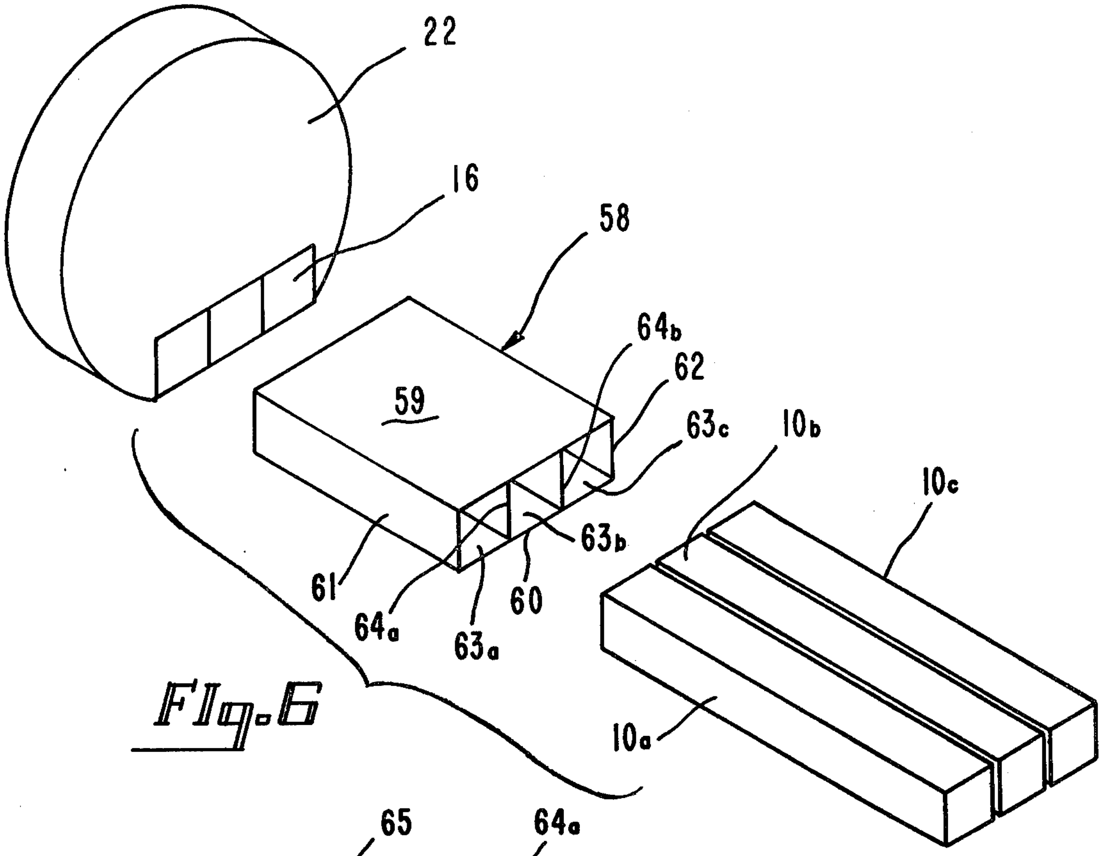
FIG. 6 is an exploded partial view, in perspective, of a modified embodiment of the invention shown in FIG. 1.
Figure 8:
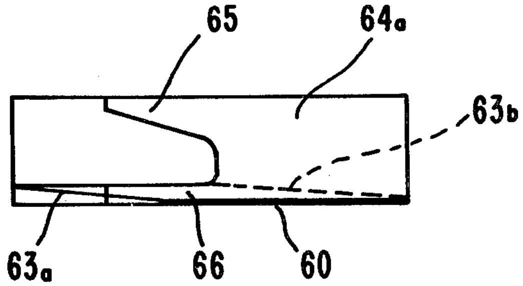
FIG. 8 is a section view taken at line 8—8 of the part of the apparatus shown in FIG. 7.
Figure 7:
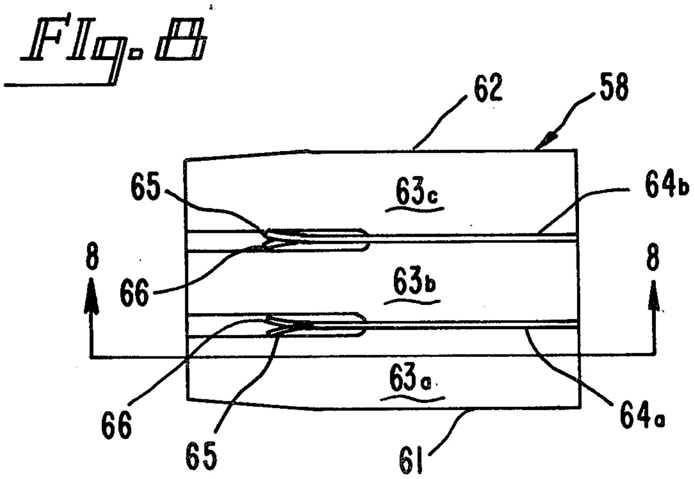
FIG. 7 is an interior plan view, with the top removed, of a part of the apparatus shown in FIG. 6.

A modified apparatus, as shown in FIGS. 6–8, is preferred where the patties 16, being simultaneously sliced from adjacent logs 17, are to be fed into separate magazines 10*a*, 10*b* and 10*c* (as shown in FIG. 6) or into separately defined channels in a single magazine (not shown). In those instances it is necessary that the severed patties 16 be laterally spaced from one another so as to accommodate the magazine or channel walls therebetween. To accomplish this the patties are passed through a transition member generally 58 placed immediately between the slicer 22 and the magazine 10. The transition member 58 comprises a chamber that is divided into a number of courses equal in number to the logs 17 being sliced simultaneously (three in the illustrated embodiment). The chamber is comprised of top and bottom panels 59 and 60, and two side walls 61 and 62, respectively. The aforementioned panels are spaced a vertical dimension greater than the height of the patties; and the walls are spaced an amount substantially equal to the width of the plural logs at the entry end, and a greater amount at the exit end. As may be best seen in FIG. 7 the side walls 61, 62 are bowed inwardly toward the entry end but are substantially parallel throughout most of the length of the transition member 58.

The vertical dimension of the transition member 58 between the top and bottom panels 59, 60 is sufficient to enable the columns of patties 16 to enter at one level, with the bottom edges thereof spaced above the bottom panel, and to exit at a lower level substantially at the bottom panel. Each course for the respective columns of patties 16 is in the form of runways 63*a*, 63*b* and 63*c*, respectively, extending from a common level at the entry end to the bottom panel 60 at the exit end within the chamber of the transitions member 58. Also within the chamber are vertical column dividers 64*a* and 64*b* extending longitudinally between adjacent runways 63*a*, 63*b* and 63*c* from the exit end to points approximately between the areas at which the sidewalls 61 and 62 bow inwardly.

As may be best seen in FIG. 8, the forward portions of column dividers 64*a* and 64*b* are bifurcated to form upper and lower guides 65 and 66 respectively which are bent slightly in directions opposite to one another. Also shown in FIG. 8 are adjacent runways 63*a* and 63*b* which are seen to follow first diverging and then converging patties (the third runway 63*c* parallels the first runway 63*a* so as to have a similar relationship to the intermediate runway 63*b*). That is runway 63*a* (and 63*c*) declines from the entry to about the midpoint of the chamber from whence it proceeds level along the bottom panel 60 to the exit; whereas runway 63*b* is level from the entry to about the midpoint from whence it declines to the bottom panel 60 at the exit. The runways 63*a*, 63*b* and 63*c* are preferably separated for short distances from the entry end of the transition member 58 and beyond the upper and lower guides 65, 66 of the column dividers 64*a* and 64*b*. This separation permits the upper guides 65 to be bent slightly outwardly so as to receive the upper portions of the central column of slices and thereby urge those slices into even alignment. The lower guides 66 are bent slightly inwardly so as to gently receive the lower inner corners of the slices of the two outer columns and to urge those slices onwardly toward the side walls 61 and 62 respectively. It will be apparent from the drawings that the vertical displacement of the slices between adjacent columns permit each of the guides 65 and 66 on any single divider 64 to contact the slices of the respective columns and urge same apart laterally without interfering with the slices of the other column.

The operation of the apparatus will be apparent from the foregoing description and the drawings. As the slicer generally 22 is operated the pusher 24 advances meat logs 17 through the path of the knife blade and consequently pushes the severed patties 16 into the channels of a magazine generally 10 positioned horizontally and in line therewith at a first position "A" on table 28. When the magazine 10 is filled it is removed from position "A" and either temporarily stored or taken directly to a second position "B".

In some operations it may be desirable to store the severed patties 16 for a period of time under certain temperature conditions before packaging same. In that case, a large number of magazines generally 10 may be utilized. Availability of a large number of magazines generally 10 will also permit one or a few operators to devote full attention to the slicing operation until a desired quantity of product had been prepared in the form of patties 16. While this operation continues the patties are accumulated and stored in magazines generally 10. Thereafter the same operators may devote attention to the assembling of the patties 16 on divider members and packaging same. A small plurality of magazines, generally 10, are useful, however, where both the slicer generally 22 and the packaging equipment are to be operated substantially simultaneously. In this instance the slicer generally 22 may be operated at intervals at production rates exceeding the capacity of the grouping and packaging equipment, and excess product may be temporarily stored until the latter equipment can work it off.

In all instances the magazines generally 10 are transported to an upright position on the tray support 34 from which they are moved, by sliding, to the second position "B" on the breech support 36 from which the lowermost patties 16 are simultaneously discharged onto the web of material 46 by reciprocation of the shuttle gate 38. Thus, it may be seen that by synchronizing the speed of the continuous belt 31 and the shuttle discharge gate 38 successive rows of patties 16 may be sequentially discharged from the magazine generally 10 so as to fall closely adjacent the preceding row of patties on the web of material 46. Periodically the shuttle discharge gate 38 is delayed sufficiently for a space to be left on the web of material 46 between successive rows of patties 16. The cutting mechanism 48, utilizing sensing devices, operates to sever the web of material 46 at those spaces. And, finally, the severed sections of web material 46 with uniform numbers of patties thereon will be automatically stacked on the lowerator 55 and when an appropriate number of layers have been placed thereon they are removed for cartoning and the like.

Obviously many modifications and variation of the invention as hereinbefore set forth may be made without departing from the spirit and scope thereof, and therefore, only such limitations should be imposed as are indicated in the appended claims.

We claim:

1. An apparatus for laterally separating columns of discrete articles of product that are moved in a given direction which columns of product are initially in side-to-side contact, said apparatus comprising: moving means disposed to advance said columns of product in said direction; plural runways aligned in said direction with said columns so as to receive said product from said moving means; and dividers between said runways, said runways first diverging vertically with respect to one another so as to vertically displace said articles in said columns of product and then converging to a single level whereby all corresponding points between the entry and exit portions of adjacent runways will be spaced vertically one from the other, said dividers being positioned to urge adjacent articles in said columns of product apart laterally while vertically displaced.

2. An apparatus for laterally separating at least two columns of discrete articles of product that are moved in a given direction, and which columns of product are initially in side-to-side contact, said apparatus comprising: moving means disposed to advance said columns of product in a given direction; a plurality of runways, said runways being aligned in said direction with said columns so as to receive said product from said moving means; horizontal entry portions of said runways, all of said entry portions being in a common plane; horizontal exit portions of said runways, all of said exit portions being at a level lower than said entry portions; mid-portions of said runways declining from said entry portions to said exit portions, said mid-portions of adjacent runways being non-parallel so as to cause adjacent articles in said columns of product moved thereacross to first diverge and then converge vertically as said articles move from said entry to said exit portions; and vertical divider members positioned between adjacent runways at said mid-portions thereof, said divider members being bifurcated to form upper and lower guides which guides are bent oppositely to one another and urge said adjacent articles in said columns in opposite directions at angles to said given direction whereby said adjacent articles in said columns will be separated horizontally upon reaching said exit portion.

* * * * *